(12) United States Patent
Chokshi et al.

(10) Patent No.: US 7,117,385 B2
(45) Date of Patent: Oct. 3, 2006

(54) METHOD AND APPARATUS FOR RECOVERY OF PARTITIONS IN A LOGICAL PARTITIONED DATA PROCESSING SYSTEM

(75) Inventors: Shaival J. Chokshi, Austin, TX (US); Ashwini Kulkarni, Austin, TX (US); Van Hoa Lee, Cedar Park, TX (US); David Lee Randall, Leander, TX (US); Thi Ngoc Tran, Round Rock, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 10/422,681

(22) Filed: Apr. 21, 2003

(65) Prior Publication Data

US 2004/0210793 A1 Oct. 21, 2004

(51) Int. Cl.
*G06F 11/00* (2006.01)
(52) U.S. Cl. .............................. 714/5; 714/15; 714/23
(58) Field of Classification Search ................. 714/5, 714/15, 23
See application file for complete search history.

(56) References Cited

U.S. PATENT DOCUMENTS

| | | | | |
|---|---|---|---|---|
| 4,601,012 | A | 7/1986 | Aiken, Jr. | 364/900 |
| 4,916,697 | A | 4/1990 | Roche et al. | 371/14 |
| 5,692,121 | A | 11/1997 | Bozso et al. | 395/182.11 |
| 5,907,672 | A | 5/1999 | Matze et al. | 395/182.06 |
| 6,065,017 | A | 5/2000 | Barker | 707/202 |
| 6,463,573 | B1 | 10/2002 | Maddalozzo, Jr. et al. | 716/6 |
| 6,725,317 | B1* | 4/2004 | Bouchier et al. | 710/312 |
| 6,820,207 | B1* | 11/2004 | Dawkins et al. | 713/324 |
| 6,920,587 | B1* | 7/2005 | Dawkins et al. | 714/48 |
| 6,976,191 | B1* | 12/2005 | Kitamorn et al. | 714/43 |
| 2002/0091805 | A1 | 7/2002 | Phillips et al. | 709/220 |
| 2002/0124194 | A1* | 9/2002 | Dawkins et al. | 713/310 |
| 2003/0204648 | A1* | 10/2003 | Arndt | 710/5 |
| 2003/0204780 | A1* | 10/2003 | Dawkins et al. | 714/24 |
| 2004/0030881 | A1* | 2/2004 | Harrington et al. | 713/2 |

(Continued)

FOREIGN PATENT DOCUMENTS

JP 2000194843 2/2000

OTHER PUBLICATIONS

Lin et al., "An Optimistic-Based Partition-Processing Approach for Distributed Shared Memory Systems", Journal of Information Science and Engineering 18, 2002, pp. 853-869.

(Continued)

*Primary Examiner*—Scott Baderman
*Assistant Examiner*—Loan Truong
(74) *Attorney, Agent, or Firm*—Duke W. Yee; Thomas E. Tyson; Theodore D. Fay, III

(57) ABSTRACT

A method, apparatus, and computer instructions for recovering terminated partitions in a logical partitioned data processing system. A termination of a partition in a set of partitions associated with a host bridge in the logical partitioned data processing system is detected. The state of other partitions within the set of partitions is checked in response to detecting the termination. A recovery process is initiated if all partitions in the set of partitions have terminated. Input/output slots associated with the host bridge are reset to a normal state if the recovery process is successful. The set of partitions is rebooted after resetting the input/output slots associated with the host bridge without rebooting the logical partitioned data processing system.

28 Claims, 4 Drawing Sheets

U.S. PATENT DOCUMENTS

2004/0153853 A1* 8/2004 Moriki et al. .................. 714/43
2004/0181657 A1* 9/2004 Armstrong et al. ............ 713/1
2004/0230783 A1* 11/2004 Brice et al. .................... 713/1

OTHER PUBLICATIONS

IBM Technical Disclosure Bulletin, "Recovery from Single Critical Hardware Resource Unavailability", vol. 36, No. 08, Aug. 1993, pp. 607-612.

Son, "Reliable Distributed Database Systems", ACM Digital Library, 1988, p. 271.

Kim et al., "A Protocol for Failure and Recovery Detection to Support Partitioned Operation in Distributed Database Systems", ACM Digital Library, 1986, pp. 1189-1196.

Jenn et al., "An Optimistic-Based Partition-Processing Approach for Distributed Shared Memory Systems", Journal of Information Science and Engineering, vol. 18, No. 6, pp. 853-869, Nov. 2002.

Joyce et al., "Rescuing Data in UNIX File System (What to do After RM*)", USENIX Association Winter Conference Dallas 1988. Proceedings, pp. 331-334, Published Berkeley, CA, USA.

* cited by examiner

METHOD AND APPARATUS FOR RECOVERY OF PARTITIONS IN A LOGICAL PARTITIONED DATA PROCESSING SYSTEM

BACKGROUND OF THE INVENTION

1. Technical Field

The present invention relates generally to an improved data processing system, and in particular a method and apparatus for handling errors. Still more particularly, the present invention provides a method and apparatus for recovery of partitions terminated in a logical partitioned system in which an error has occurred.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the operating system image.

Each distinct operating system or image of an operating system running within the platform is protected from each other such that software errors on one logical partition cannot affect the correct operation of any of the other partitions. This is provided by allocating a disjoint set of platform resources to be directly managed by each operating system image and by providing mechanisms for ensuring that the various images cannot control any resources that have not been allocated to it. Furthermore, software errors in the control of an operating system's allocated resources are prevented from affecting the resources of any other image. Thus, each image of the operating system (or each different operating system) directly controls a distinct set of allocable resources within the platform.

Currently, in LPAR data processing systems, when an unrecoverable host bridge error occurs, up to four partitions are terminated if the four input/output (I/O) slots under this host bridge are allocated to more than one partition. These partitions remain in an error state and cannot be rebooted until the LPAR data processing system's AC power is recycled. LPAR data processing systems are often used as servers, such as web servers, to provide services on the Internet or as application servers to provide services within an organization. Thus, such a situation is undesirable because of interruptions in services being provided by the LPAR data processing system.

Therefore, it would be advantageous to have an improved method, apparatus, and computer instructions for recovering from errors, such as those in a host bridge.

SUMMARY OF THE INVENTION

The present invention provides a method, apparatus, and computer instructions for recovering terminated partitions in a logical partitioned data processing system. A termination of a partition in a set of partitions, which owns one or more I/O slots under the same host bridge in the logical partitioned data processing system is detected. The state of other partitions within the set of partitions is checked in response to detecting the termination. A recovery process is initiated if all partitions in the set of partitions have terminated. Input/output slots associated with the host bridge are reset to a normal state if the recovery process is successful. The set of partitions is rebooted after resetting the input/output slots associated with the host bridge without rebooting the logical partitioned data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
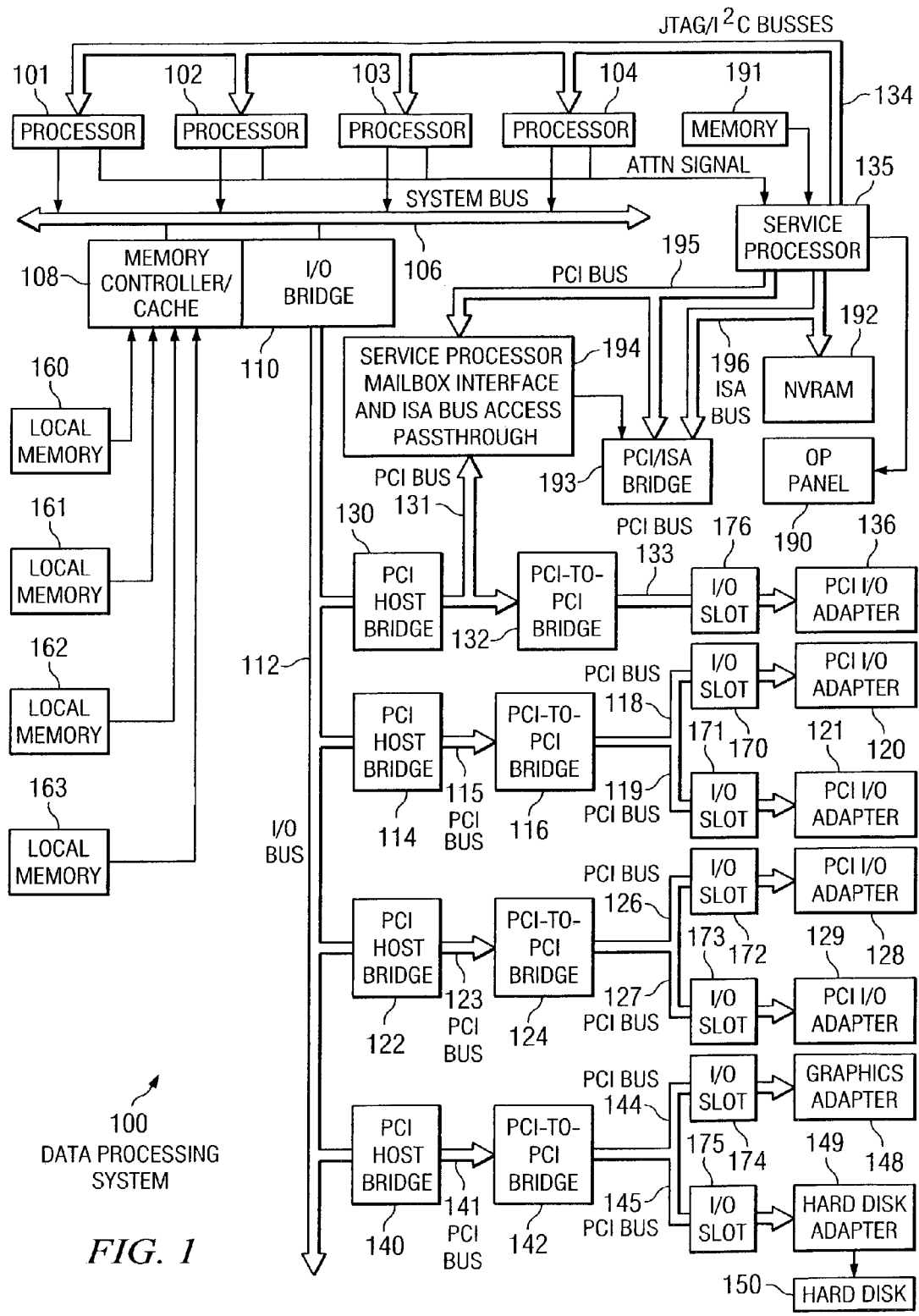
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eserver, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P1. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/o adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATS, and memory tests, then data processing system 100 is allowed to proceed to load executable code into local (host) memories 160–163. Service processor 135 then releases the host processors 101–104 for execution of the code loaded into local memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eserver iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

A component is considered to be under some other component if that component is on a lower level than the other component in a hierarchal or tree structure. For example, I/O 170 and I/O slot 171 are considered to be below PCI host bridge 114 in FIG. 1. Hard disk 150 and hard disk adapter 149 are considered to be below PCI host bridge 140 in FIG. 1. I/O slot 173, however, is not considered to be below PCI host bridge 140 because this component is located in a different branch.

Figure 2:
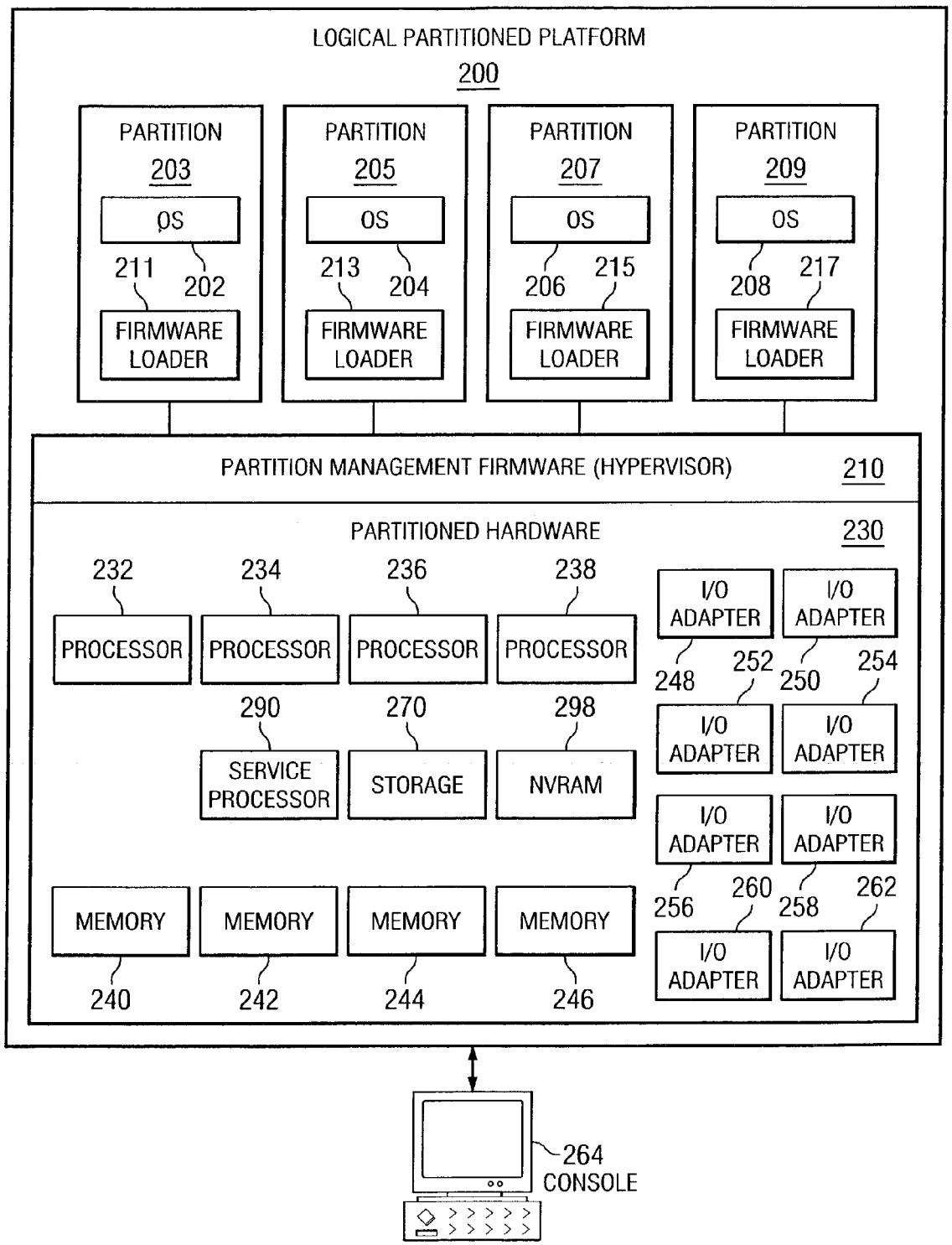
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as console 264. Console 264 is a separate data processing system from which a system administrator may perform various functions including reallocation of resources to different partitions.

The present invention provides a method, apparatus, and computer instructions for handling an error occurring with respect to a host bridge, such as PCI host bridge 130 in FIG. 1. This mechanism allows for recovery of partitions affected by this error without having to reboot the logical partitioned data processing system. When a host bridge error causes partitions, sharing the host bridge, to go into an error state, the mechanism of the present invention checks the state of other partitions sharing the host bridge generating the error. If those partitions are in a ready or error state then a recovery process is initiated. A ready state in a partition is a state in which the partition has shut down normally without encountering an error. An error state in a partition is one in which an error has occurred.

The recovery process of the present invention is initiated, in the depicted examples, only if all of the partitions, sharing the host bridge that has generated the error, are in a ready or error state. For example, an error may occur in the host bridge if a slot status is marked as bad for a slot under the host bridge. In these examples, in such a situation, the partition is referred to as having been terminated. In other words, a terminated partition is a partition in an error state or a ready state. In this recovery process, a determination is made as to whether the host bridge is accessible. If the host bridge is accessible, the recovery process is then formed.

Figure 3:
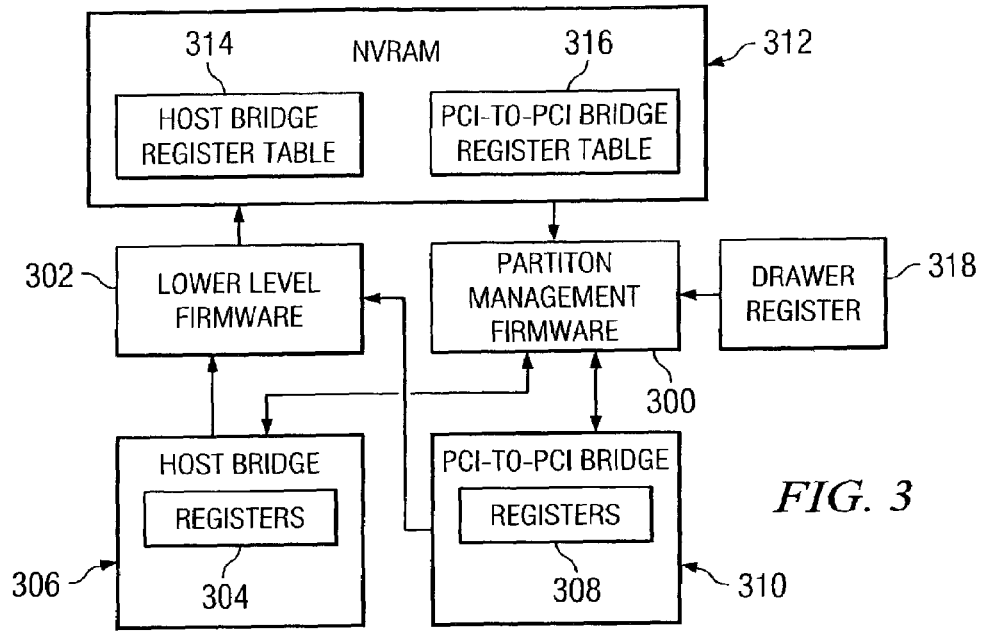
FIG. 3 is a diagram of components used in providing recovery for terminated partitions in a logical partitioned data processing system in accordance with a preferred embodiment of the present invention.

Turning now to FIG. 3, a diagram of components used in providing recovery for terminated partitions in a logical partitioned data processing system is depicted in accordance with a preferred embodiment of the present invention. In these examples, partition management firmware 300 is the component that performs the recovery process of the present invention.

When system 100 is booting, low level firmware 302 is executed to configure the entire I/O subsystem. At the end of this I/O subsystem configuration process, the initial setup of the hardware states of various components is saved by low level firmware 302. In these examples, the state of registers in host bridge 306, and state of registers 308 in PCI-to-PCI bridge 310 are stored in a memory, such as nonvolatile random access memory (NVRAM) 312. In these examples, the state of registers 304 are saved in host bridge register tables 314, while the state of registers 308 are stored in PCI-to-PCI bridge register table 316. This information is used by partition management firmware 300 if a recovery process is initiated.

If partition management firmware 300 detects a partition going down or terminating, partition management firmware 300 will initiate a recovery process if the detected partition that terminates is the last partition that is executing. In other words, the recovery process is initiated only after all of the partitions have gone down. If all of the partitions sharing the host bridge have terminated, in a ready or error state, partition management firmware 300 will determine whether the host bridge can be accessed.

In these examples, a determination is made as to whether host bridge 306 is accessible through a call to read a register, such as drawer register 318. In these examples, a drawer is a location within a frame. Each drawer has some maximum number of slots into which I/O devices are mounted. Frames provide a mounting as well as power for various components. In these examples, the drawer's draw-ID register is read.

If the host bridge is accessible, partition management firmware 300 will then initiate a recovery process that resets host bridge 306 and PCI-to-PCI bridge 310. In these examples, interrupts are masked off. Direct memory access (DMA) is disabled. In these examples, DMA is disabled by writing zeros to arbitration registers in the host bridge. Thereafter, the host bridge is reset. Translation control entry (TCE) enable flag is toggled to clear out any DMA translation that may have been cached in the hardware translation look-aside buffer (TLBs). Then, the error registers in host bridge 306 are cleared. A built in self-test (BIST) command is issued to the appropriate register in PCI-to-PCI bridge 310. This request is used to reset PCI-to-PCI bridge 310. Thereafter, DMA is enabled. At this point, both bridges have been reset and are accessible.

Next, partition management firmware 300 will reprogram host bridge 306 and PCI-to-PCI bridge 310. These bridges are reprogrammed by resetting the states of registers 304 and registers 308 using state information stored in host bridge register state table 314 and PCI-to-PCI bridge register table 316. Although both bridges are reset to the states that were present when the system was booted, optimizations may have been made to PCI-to-PCI bridge 310. These optimizations typically occur after the system was booted by the partition open firmware. Thus, these optimizations will have to be remade.

After the completion of the recovery process, partition management firmware 300 changes the state and status of all of the slots under the recovery host bridge. The state and status of these slots are changed to a normal state. Status indicates whether the hardware is present, not present, present-usable (normal), or present-unusable. State indicates whether the hardware is running (normal, being used and no error encountered) or error (error encountered and stopped). Thereafter, the partitions affected by the host bridge are booted.

Figure 4:
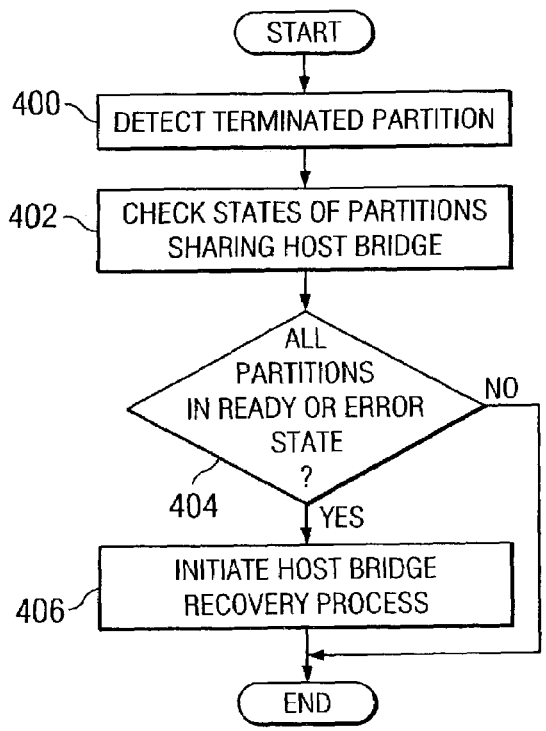
FIG. 4 is a flowchart of a process for handling the failure of partitions in accordance with a preferred embodiment of the present invention.

Turning now to FIG. 4, a flowchart of a process for handling the failure of partitions is depicted in accordance with a preferred embodiment of the present invention. The process illustrated in FIG. 4 may be implemented in a partition manager, such as partition management firmware 300 in FIG. 3.

The process begins by detecting a terminated partition (step 400). In these examples, a terminated partition is a partition that is in an error or ready state. In response to detecting the terminated partition, the states of other partitions sharing the host bridge are checked (step 402). A determination is made as to whether all of the partitions are in a ready or error state (step 404). In other words, step 404 determines whether all of the partitions sharing the host bridge have terminated.

If all of the partitions have terminated, a host bridge recovery process is initiated, with the process terminating thereafter. On the other hand, if all of the partitions are not in a ready or error state, the process terminates without starting a recovery process.

Figure 5:
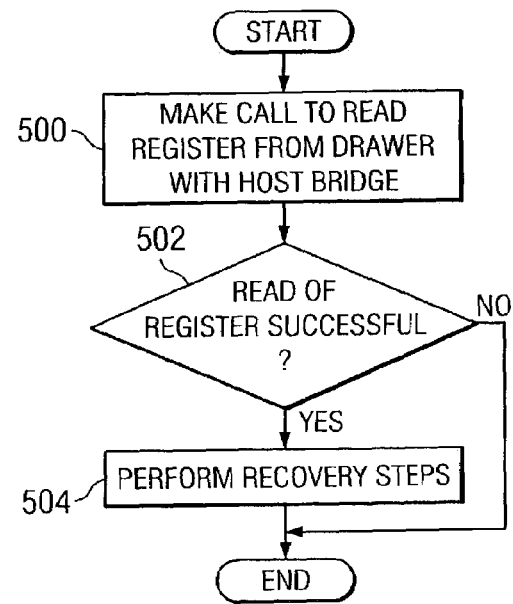
FIG. 5 is a flowchart of a process used to detect whether a host bridge is accessible in accordance with a preferred embodiment of the present invention.

With reference next to FIG. 5, a flowchart of a process used to detect whether a host bridge is accessible is depicted in accordance with a preferred embodiment of the present invention. The process illustrated in FIG. 5 may be implemented in a partition manager, such as partition management firmware 300 in FIG. 3.

The process begins by making a call to read a register in a drawer containing a host bridge (step 500). A determination is made as to whether this call is successful (step 502). If the register can be read, then recovery steps for a recovery process are performed (step 504), with the process terminating thereafter. With reference again to step 502, if the register cannot be successfully read, the recovery steps for the recovery process are not performed. In this instance, the host bridge is not accessible and cannot be reset.

Figure 6:
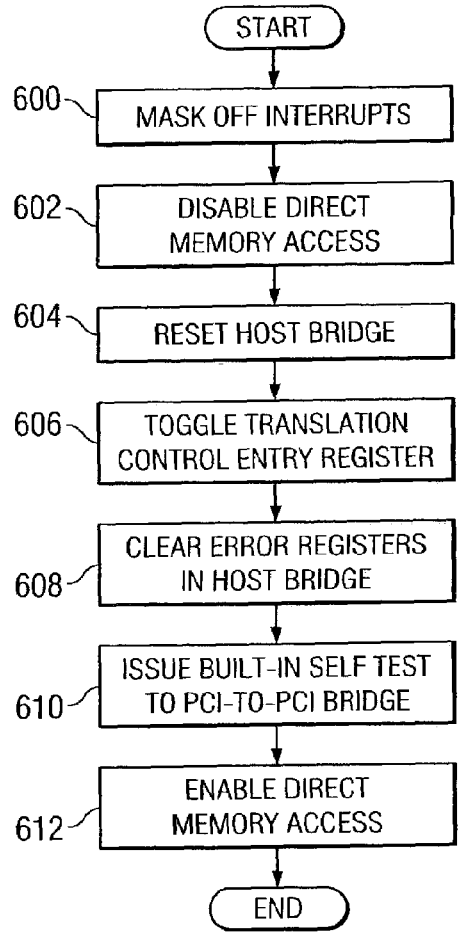
FIG. 6 is a flowchart of a recovery process in accordance with a preferred embodiment of the present invention.

With reference to FIG. 6, a flowchart of a recovery process is depicted in accordance with a preferred embodiment of the present invention. This recovery process may be implemented in a partition manager, such as partition management firmware 300 in FIG. 3.

The process begins by masking off interrupts (step 600). Interrupts may be masked off by writing FF values to various registers in the host bridge. Thereafter, direct memory access is disabled (step 602). Direct memory access is disabled by writing an appropriate value, such as a zero, to an arbitration register in the host bridge. The goal is to disable the arbitration function to disable DMA access to the host bridge. DMA is disabled to prevent any access to the host bridge by any other devices. The host bridge is then reset (step 604). In these examples, a host bridge may be reset by toggling and selectively setting the appropriate bits needed to reset the host bridge. Thereafter, the translation control entry registers are toggled (step 606). This step is performed to flush or clear out any address translation in the hardware translation look-aside buffer (TLB) for DMA transfers that may have been in process when the error occurred.

Next, error registers in the host bridge are cleared (step 608), and a built-in self test command is issued to the PCI-to-PCI bridge (step 610). These two steps are used to reset the two bridges. Thereafter, direct memory access is enabled (step 612), with the process terminating thereafter. At this point, both bridges have been reset and are ready to be reprogrammed.

Figure 7:
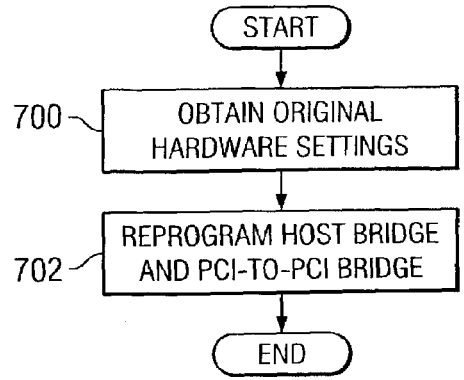
FIG. 7 is a flowchart of a process for reprogramming bridges in accordance with a preferred embodiment of the present invention.

With reference now to FIG. 7, a flowchart of a process for reprogramming bridges is depicted in accordance with a preferred embodiment of the present invention. The process illustrated in FIG. 7 may be implemented in a partition manager, such as partition management firmware 300 in FIG. 3.

The process begins by obtaining original hardware settings for the host bridge and the PCI-to-PCI bridge (step 700). These settings are ones that were saved when the system was initialized as described above. Next, the host bridge and the PCI-to-PCI bridge are reprogrammed using the saved hardware settings (step 702) with the process terminating thereafter. The optimization process will not be performed at this point. This optimization process will be performed as the partitions are restarted.

Figure 8:
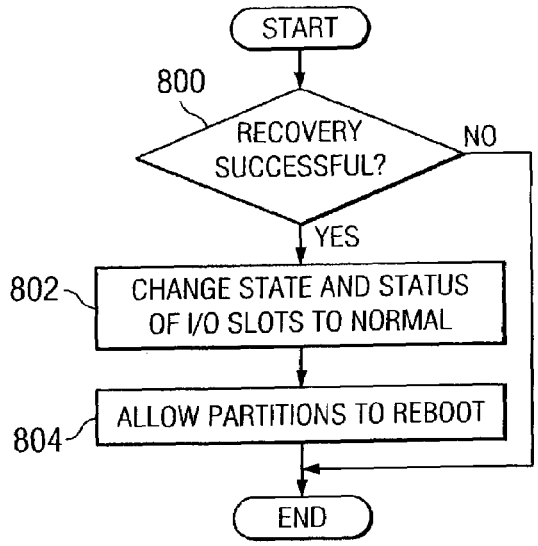
FIG. 8 is a flowchart of a process for restarting partitions in accordance with a preferred embodiment of the present invention.

In FIG. 8, a flowchart of a process for restarting partitions is depicted in accordance with a preferred embodiment of the present invention. The process illustrated in FIG. 8 may be implemented in a partition manager, such as partition management firmware 300 in FIG. 3.

The process begins by determining whether the recovery process for resetting and reprogramming the host bridges is successful (step 800). If the recovery process does not encounter any error, the process will return a success return code. Otherwise, the recovery process will return an error return code. If the recovery process was successful, the state and status of the slots are changed to a normal state (step 802). Thereafter, the partitions are allowed to reboot (step 804), with the process terminating thereafter. This rebooting of the partitions occurs without having to reboot or restart the entire logical partitioned data processing system.

With reference again to step 800, if the recovery was not successful, the process terminates. In this case, no other action is taken and the partition can be restarted only with a reboot of the entire logical partitioned data processing system.

Thus, the present invention provides a method, apparatus, and computer instructions for handling terminated partitions in a logical partitioned data processing system without having to reboot or restart the entire system. The mechanism of the present invention initiates a recovery process only if all of the partitions have terminated in these examples. This mechanism isolates the host bridge containing the error. Thereafter, the host bridge and the PCI-to-PCI bridge are reset and reprogrammed. If this recovery process for the bridges is successful, then the partitions are restarted without affecting the other partitions in the other logical partitioned data processing systems.

The mechanism of the present invention waits for all of the partitions to terminate because a partition may run normally as long as the partition does not use an I/O slot under the host bridge, which has currently encountered an error. By waiting for all of the partitions to terminate, partitions that have not failed can continue to operate and process requests. If such a situation is not desired, the process and the mechanism may be run prior to all of the partitions terminating. If the process of the present invention is to be run prior to all of the partitions terminating, the management firmware cannot guarantee that a partition that is still running would not use this I/O slot after the recovery process has begun. Thus, in this situation, it is desirable to wait for all of the partitions to terminate, or to actively terminate all of the partitions before initiating the recovery process of the present invention.

Further, although the depicted examples are illustrated with respect to a host bridge, the mechanism of the present invention may be applied to other devices in a data processing system in a hierarchal topology. For example, each I/O drawer currently has three host bridges attached to an internal RIO bus. If each of the host bridges is allocated to three different partitions, then these partitions are considered sharing the I/O drawer. If there is an error in one host bridge which affects the operation of internal RIO bus, it will affect the other two host bridges. The mechanism of the present invention may be applied in this condition. In this case, isolation of the host bridge in error occurs with the I/O drawer then being reset. As with the host bridge, the I/O drawer, the host bridges, and the PCI-PCI bridges are then all reprogrammed and the partitions may then be restarted.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system for recovering terminated partitions, the method comprising:
   detecting a termination of a partition in a set of partitions associated with a host bridge in the logical partitioned data processing system;
   responsive to detecting the termination, checking a state of other partitions within the set of partitions;
   initiating a recovery process if all partitions in the set of partitions have terminated;
   resetting input/output slots associated with the host bridge to a normal state if the recovery process is successful; and
   rebooting the set of partition after resetting the input/output slots associated with the host bridge without rebooting the logical partitioned data processing system.

2. The method of claim 1, wherein the termination of the partition is caused by an error in the host bridge.

3. The method of claim 2, wherein the error comprises an input/output slot in the input/output slots being marked as bad.

4. The method of claim 1, wherein the recovery process includes:
   masking off interrupts;
   disabling direct memory access;
   resetting the host bridge;
   clearing error registers associated with the host bridge; and
   enabling direct memory access after clearing the error registers.

5. The method of claim 1, wherein the recovery process includes reprogramming the host bridge.

6. The method of claim 5, wherein the host bridge is reprogrammed using previously saved hardware state information.

7. The method of claim 1, wherein the method is implemented in a partition manager.

8. The method of claim 1, wherein the recovery process is for the host bridge.

9. A method in a logical partitioned data processing system for handling an error state for a set of partitions, the method comprising:
   detecting an error in a shared device assigned to the set of partitions in the logical partitioned data processing system;
   checking a state of other partitions within the set of partitions;
   initiating a recovery process for the shared device if all the partitions in the set of partitions have terminated;
   resetting the shared device if the recovery process is successful; and
   rebooting the set of partitions after the share device has been reset.

10. The method of claim 9, wherein the shared device is a host bridge.

11. A method in a logical partitioned data processing system for handling an error state for a set of partitions caused by an input/output slot being marked bad, the method comprising:
responsive to the set of partitions associated with a host bridge going into the error state in the logical partitioned data processing system, initiating a recovery process to reset the host bridge;
determining whether the recovery process is successful;
restoring hardware states in the host bridge if the recovery process is successful;
changing the input/output slot to a normal state; and
booting the set of partitions.

12. A logical partitioned data processing system for recovering terminated partitions, the logical partitioned data processing system comprising:
detecting means for detecting a termination of a partition in a set of partitions associated with a host bridge in the logical partitioned data processing system;
checking means, responsive to detecting the termination, for checking a state of other partitions within the set of partitions;
initiating means for initiating a recovery process if all partitions in the set of partitions have terminated;
resetting means for resetting input/output slots associated with the host bridge to a normal state if the recovery process is successful; and
rebooting means for rebooting the set of partitions after resetting the input/output slots associated with the host bridge without rebooting the logical partitioned data processing system.

13. The logical partitioned data processing system of claim 12, wherein the termination of the partition is caused by an error in the host bridge.

14. The logical partitioned data processing system of claim 13, wherein to error comprises an input/output slot in the input/output slots being marked as bad.

15. The logical partitioned data processing system of claim 12, wherein the recovery process includes:
masking means for masking off interrupts;
disabling means for disabling direct memory access;
resetting means for resetting the host bridge;
clearing means for clearing error registers associated with the host bridge; and
enabling means for enabling direct memory access alter clearing the error registers.

16. The logical partitioned data processing system of claim 12, wherein the recovery process includes reprogramming means for reprogramming the host bridge.

17. The logical partitioned data processing system of claim 16, wherein the host bridge is reprogrammed using previously saved hardware state information.

18. The logical partitioned data processing system of claim 12, wherein the detecting means, checking means, initiating means, resetting means, and rebooting means are implemented in a partition manager.

19. The logical partitioned data processing system of claim 12, wherein the recovery process is for the host bridge.

20. A logical partitioned data processing system in a logical partitioned data processing system for handling an error state for a set of partitions, the logical partitioned data processing system comprising:
detecting means for detecting an error in a shared device assigned to the set of partitions in the logical partitioned data processing system;
checking means for checking a state of other partitions within the set of partitions;
initiating means for initiating a recovery process for the shared device if all the partitions in the set of partitions have terminated;
resetting means for resetting the shared device if the recovery process is successful; and
rebooting means for rebooting the set of partitions after the share device has been reset.

21. The logical partitioned data processing system of claim 20, wherein the shared device is a host bridge.

22. A logical partitioned data processing system in a logical partitioned data processing system for handling an error state for a set of partitions caused by an input/output slot being marked bad, the logical partitioned data processing system comprising:
initiating means, responsive to the set of partitions associated with a host bridge going into the error state in the logical partitioned data processing system, for initiating a recovery process to reset the host bridge;
determining means for determining whether the recovery process is successful;
restoring means for restoring hardware states in the host bridge if the recovery process is successful;
changing means for changing the input/output slot to a normal state; and
booting means for booting the set of partitions.

23. A logical partitioned data processing system for recovering terminated partitions, the logical partitioned data processing system comprising:
a bus system;
a memory connected to the bus system, wherein the memory includes a set of instructions;
a processing unit having a plurality of processors and being connected to the bus system, wherein the processing unit executes the set of instructions to detect a termination of a partition in a set of partitions associated with a host bridge in the logical partitioned data processing system; check a state of other partitions within the set of partitions responsive to detecting the termination; initiate a recovery process if all partitions in the set of partitions have terminated; reset input/output slots associated with the host bridge to a normal state if the recovery process is successful; and reboot the set of partitions after resetting the input/output slots associated with the host bridge without rebooting the logical partitioned data processing system.

24. A logical partitioned data processing system for handling an error state for a set of partitions, the logical partitioned data processing system comprising:
a bus system;
a memory connected to the bus system, wherein the memory includes a set of instructions; and
a processing unit having a plurality of processors and being connected to the bus system, wherein the processing unit executes the set of instructions to detect an error in a shared device assigned to the set of partitions in the logical partitioned data processing system; check a state of other partitions within the set of partitions; initiate a recovery process for the shared device if all the partitions in the set of partitions have terminated; reset the shared device if the recovery process is successful; and reboot the set of partitions after the share device has been reset.

25. A logical partitioned data processing system for handling an error state for a set of partitions caused by an input/output slot being marked bad, the logical partitioned data processing system comprising:

a bus system;

a memory connected to the bus system, wherein the memory includes a set of instructions; and a processing unit having a plurality of processors and being connected to the bus system, wherein the processing unit executes the set of instructions to initiate a recovery process to reset the host bridge, responsive to the set of partitions associated with a host bridge going into the error state in the logical partitioned data processing system; determine whether the recovery process is successful; restore hardware states in the host bridge if the recovery process is successful; change the input/output slot to a normal state; and boot the set of partitions.

26. A computer program product in a computer recordable medium for recovering terminated partitions, in a logical partition in a data processing system the computer program product comprising:

first instructions for detecting a termination of a partition in a set of partitions associated with a host bridge in the logical partitioned data processing system;

second instructions, responsive to detecting to termination, for checking a state of other partitions within the set of partitions;

third instructions for initiating a recovery process if all partitions in the set of partitions have terminated;

fourth instructions for resetting input/output slots associated with the host bridge to a normal state if the recovery process is successful; and fifth instructions for rebooting the set of partitions after resetting the input/output slots associated with the host bridge without rebooting the logical partitioned data processing system.

27. A computer program product in a computer recordable medium for handling an error state for a set of partitions in a logical partitioned data processing system, the computer program product comprising:

first instructions for detecting an error in a shared device assigned to the set of partitions in the logical partitioned data processing system;

second instructions for checking a state of other partitions within the set of partitions;

third instructions for initiating a recovery process for the shared device if all the partitions in the set of partitions have terminated;

fourth instructions for resetting the shared device if the recovery process is successful; and fifth instructions for rebooting the set of partitions after the share device has been reset.

28. A computer program product in a logical partitioned data processing system for handling an error state for a set of partitions caused by an input/output slot being marked bad, the computer program product comprising:

first instructions, responsive to the set of partitions associated with a host bridge going into the error state in the logical partitioned data processing system, for initiating a recovery process to reset the host bridge;

second instructions for determining whether the recovery process is successful;

third instructions for restoring hardware states in the host bridge if the recovery process is successful;

fourth instructions for changing the input/output slot to a normal state; and fifth instructions for booting the set of partitions.

* * * * *